United States Patent [19]

Takakura et al.

[11] Patent Number: 4,766,412
[45] Date of Patent: Aug. 23, 1988

[54] ELECTRONIC COMPOSITE COMPONENT HAVING RESISTOR ELEMENT

[75] Inventors: Shin-ichi Takakura; Shigehiro Nojiri; Norio Sakai, all of Nagaokakyo, Japan

[73] Assignee: Murata Manufacturing Co., Ltd., Japan

[21] Appl. No.: 52,490

[22] Filed: May 20, 1987

[30] Foreign Application Priority Data

May 23, 1986 [JP] Japan .................................. 61-119450

[51] Int. Cl.⁴ ............................................. H01C 13/00
[52] U.S. Cl. ..................................... 338/334; 338/308; 338/309
[58] Field of Search ............... 338/308, 309, 311, 260, 338/320, 333, 334; 29/610 R

[56] References Cited

U.S. PATENT DOCUMENTS 3,781,610  12/1973  Bodway .................. 338/34

Primary Examiner—C. L. Albritton
Attorney, Agent, or Firm—Ostrolenk, Faber, Gerb & Soffen

[57] ABSTRACT

An electronic composite component is composed of a resistor element formed by a resistor film and a functional element such as a capacitor element which is electrically connected in parallel with the resistor element. The functional element has a body and a pair of terminal electrodes formed on respective end surfaces of the body. A serially extending electric insulation layer is formed on the surface of the body to partially cover the pair of terminal electrodes. This electric insulation layer is formed to selectively determine the distance between exposed regions of the terminal electrodes. The resistor film forming the resistor element is provided to partially cover and interconnect the exposed regions of the terminal electrodes and cross the boundary lines between the insulation layer and the exposed regions of the terminal electrodes, to electrically connect the pair of terminal electrodes with each other, through a resistance selectively determined according to the distance between the exposed regions of the terminal electrodes.

9 Claims, 2 Drawing Sheets

_4,766,412_

ELECTRONIC COMPOSITE COMPONENT HAVING RESISTOR ELEMENT

BACKGROUND OF THE INVENTION

1. Field of the Invention

The present invention relates to an electronic composite component such as an RC composite component having a resistor element, and more particularly, it relates to an improvement for reducing variation in resistance values of resistor elements between the obtained components.

2. Description of the Prior Art

FIG. 6 is a plan view showing a typical example of a conventional RC composite component. Such an RC composite component has a capacitor element and a resistor element, which are connected in parallel with each other.

The capacitor element comprises, e.g., a laminated ceramic capacitor chip, and its body 1 is provided with a pair of terminal electrodes 2 and 3 on both end surfaces thereof. These terminal electrodes 2 and 3 are formed by coating metal paste on both end portions of the body 1 or dipping both end portions of the body 1 in a metal paste bath to adhere the metal paste to both end portions of the body 1 and baking the same.

A resistor film 4 for serving as a resistor element is provided on the surface of the body 1. The resistor film 4 is formed by preparing a film of resistance paste through screen printing, intaglio printing, relief printing or the like and baking the same. The resistor film 4 is adapted to partially cover the pair of terminal electrodes 2 and 3, whereby the same is electrically connected to the pair of terminal electrodes 2 and 3.

The resistance value provided by the resistor film 4 of the composite component as shown in FIG. 6 is determined by the distance A between respective inner edges of the pair of terminal electrodes 2 and 3. However, the distance A cannot be easily determined in design, since the terminal electrodes 2 and 3 are formed by application of metal paste as hereinabove described, and hence it is difficult to constantly locate the inner edges thereof in position with good reproducibility. Further, the distance A between the inner edges of the pair of terminal electrodes 2 and 3 may be varied with variation in size of the body 1.

Therefore, even if such resistor films 4 are designed to be in uniform thickness, resistance values drawn out between respective pairs of terminal electrodes 2 and 3 are varied in the obtained components, which increases the fraction of the components that are defective.

While trimming is generally performed with a laser or the like to adjust the resistance values, such a trimming step requires a long time when the resistance values are extremely varied as hereinabove described.

Further, when the resistor film 4 is trimmed by laser, the surface part of the body 1, being just under the part removed by the trimming, may be damaged to deteriorate the quality of the capacitor element, for example.

SUMMARY OF THE INVENTION

Accordingly, it is an object of the present invention to provide a composite component which can easily provide a desired resistance value by means of a resistor film.

Provided according to the present invention is an electronic composite component which comprises first and second functional elements. The first functional element is a resistor element formed by a resistor film, which is provided on the surface of a body forming the second functional element, to partially cover first and second terminal electrodes provided for the second functional element along the surface of the body, and the aforementioned problem is solved as follows:

Regions of the first and second terminal electrodes, which have been generally covered by a resistor film, are partially covered by an electric insulation layer to determine the distance between exposed regions of the first and second terminal electrodes, so that the resistor film partially covers the exposed regions of the terminal electrodes across boundary lines between the insulation layer and the exposed regions of the terminal electrodes.

According to the present invention, an effective region of the resistor film is determined by the boundary lines between the insulation layer and the exposed regions of the terminal electrodes regardless of the mode of forming the terminal electrodes. Thus, the resistance value obtained from the resistor film can be set by selecting the region for forming the insulation layer, particularly positions of edges of the insulation layer located on the respective terminal electrodes.

Therefore, even if terminal electrodes are varied in region of formation or bodies are varied in size, resistance values obtained from resistor films can be set independently of such variation, whereby variation between resistance values of the obtained components can be reduced to improve the fraction nondefective.

Further, the resistance value can be adjusted by the mode of forming the insulation layer. Thus, the resistance value is not substantially determined by the size of the body and that of the terminal electrodes as in the conventional case, but the adjustable range of the resistance value can be extended.

Variation in resistance value can be originally reduced by formation of the insulation layer according to the present invention while, even if the resistor film is trimmed by laser, the second functional element can be protected against damage by presence of the insulation layer.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
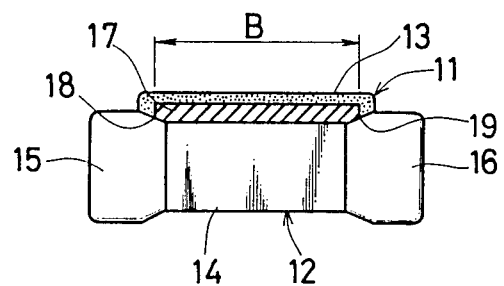
FIG. 1 is a partially fragmented front elevational view of an RC composite component according to an embodiment of the present invention.
Figure 2:
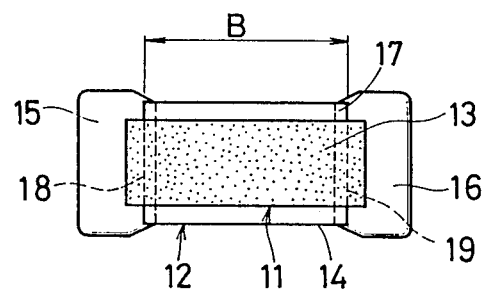
FIG. 2 is a plan view of the RC composite component as shown in FIG. 1.

FIG. 1 is a partially fragmented front elevational view showing an RC composite component according to an embodiment of the present invention, and FIG. 2 is a plan view of the RC composite component as shown in FIG. 1.

The RC composite component as shown in FIGS. 1 and 2 has a resistor element 11 and a capacitor element 12 as first and second functional elements, respectively, to be composed with each other. The resistor element 11 is formed by a resistor film 13. The capacitor element 12 is formed by, e.g., a laminated ceramic capacitor chip, and a body 14 thereof is provided with terminal electrodes 15 and 16 on its end surfaces respectively.

The terminal electrodes 15 and 16 are formed substantially in a similar manner to the conventional terminal electrodes 2 and 3. Further, a method of forming the resistor film 13, which is hereinafter described in concrete terms, is essentially similar to that of forming the conventional resistor film 4.

Figure 6:
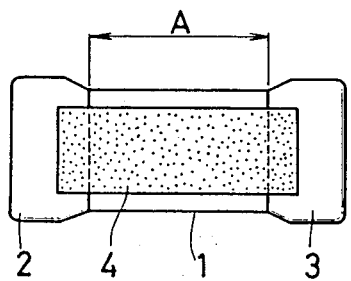
FIG. 6 is a plan view showing a conventional RC composite component.

FIGS. 1 and 2 show an insulation layer 17, which characterizes the present invention. As obvious from comparison with FIG. 6, the insulation layer 17 is adapted to partially cover regions corresponding to those of the conventional terminal electrodes 2 and 3, which have been covered by the resistor film 4. Namely, the insulation layer 17 is adapted to cover respective inner edges of the terminal electrodes 15 and 16, as seen in FIGS. 1 and 2. Thus, the distance between exposed regions of the terminal electrodes 15 and 16, i.e., the distance B, is determined by the both edges of the insulation layer 17. The resistor film 13 is adapted to partially cover the exposed regions of the terminal electrodes 15 and 16 across boundary lines 18 and 19 between the insulation layer 17 and the exposed regions of the terminal electrodes 15 and 16. Preferably the boundary lines 18 and 19 linearly extend respectively.

Description is now concretely made on preferable methods of forming the insulation layer 17 and the resistor film 13 after the capacitor element 12 is prepared.

Figure 3:
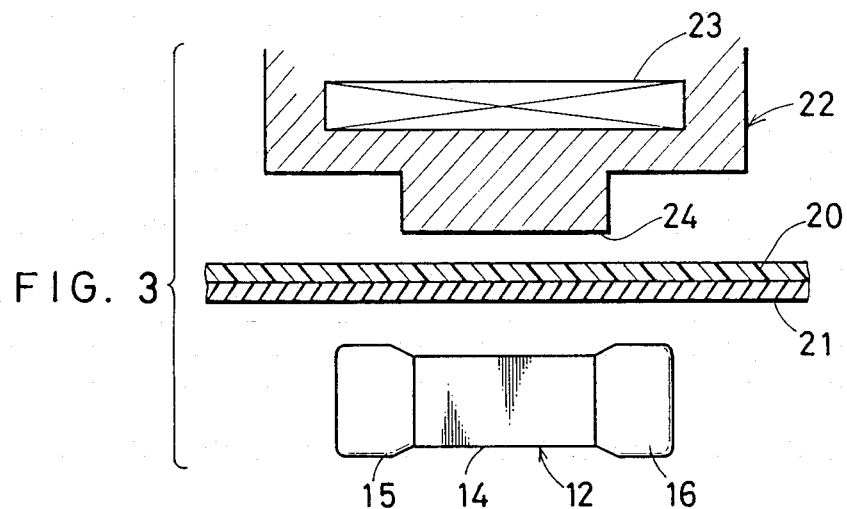
FIGS. 3 an 4 are views for illustrating an exemplary method of forming an insulation layer 17 on a capacitor element 12.

First, as shown in FIG. 3, a base film 20 of, e.g., polyethylene terephthalate or the like, is coated on its one surface with an adhesive agent 21 of acrylic resin, polyvinyl butyral, cyclized rubber, vinyl acetate resin or the like for forming the insulation layer 17. Then the capacitor element 12 is placed in the vicinity of the adhesive agent 21, and a thermal head 22 is arranged in the vicinity of the base film 20. The thermal head 22 has a heater 23, and is partially provided with a projection 24.

Figure 4:
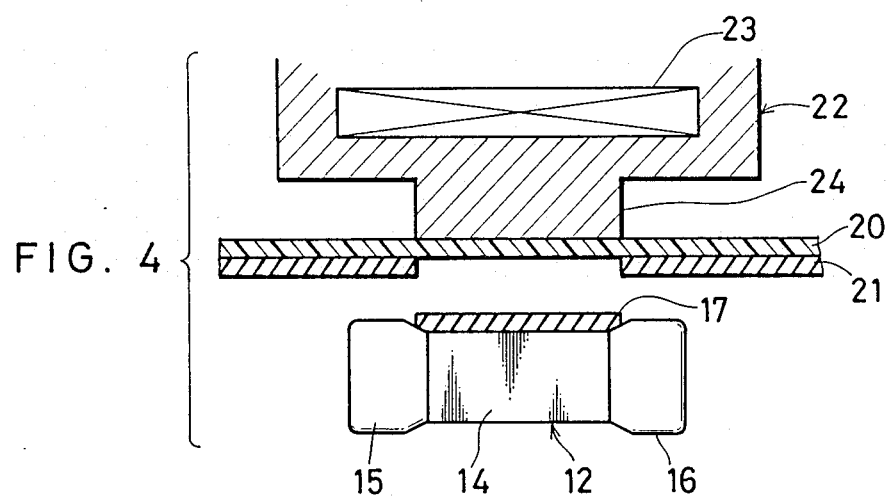

Then, as shown in FIG. 4, the thermal head 22 is so driven that a specific part of the adhesive agent 21 is thermally transferred to respective parts of the body 14 and the terminal electrodes 15 and 16 of the capacitor element 12. The region of the adhesive agent 21 to be thermally transferred is correctly defined by the projection 24 of the thermal head 22, so that the insulation layer 17 is formed on the capacitor element 12 in designed size and pattern.

Figure 5:
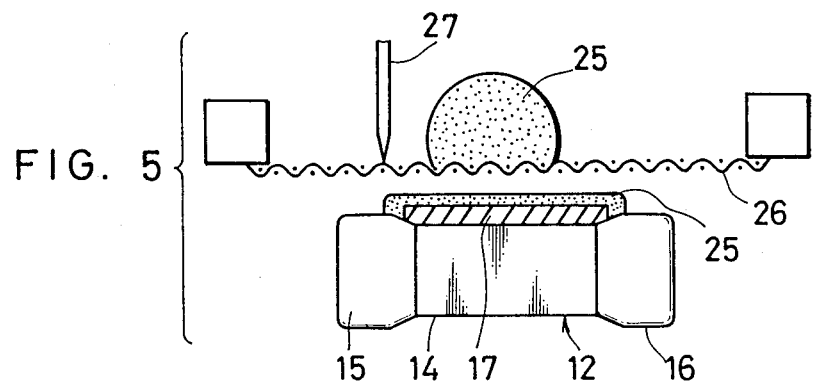
FIG. 5 is a view for illustrating an exemplary method of forming a resistor film 13.

Then, as shown in FIG. 5, a resistance paste member 25 is printed on the capacitor element 12 provided with the insulation layer 17 by a squeegee 27 through a screen 26. The resistance paste member 25 thus printed is baked or hardened to form the resistor film 13 as shown in FIGS. 1 and 2. In place of the aforementioned printing method, the resistor film 13 may be formed by a dry transfer method.

Further, a protective film (not shown) may be formed to cover the resistor layer 13, if necessary.

Employed in the aforementioned step of forming the insulation layer 17 is a thermal transfer system, which can form the insulation layer 17 in extremely correct size and pattern. However, the method of forming the insulation layer 17 is not restricted to the thermal transfer system, but another printing system such as screen printing, relief printing or intaglio printing may be employed.

Although the insulation layer 17 and the resistor film 13 are formed in separate steps in the aforementioned embodiment, the same may be simultaneously formed through thermal transfer. Further, a protective layer (not shown) may be formed at the same time through such thermal transfer.

In the aforementioned embodiment, the insulation layer 17 continuously extends from the terminal electrode 15 to the other terminal electrode 16. Such formation of the insulation layer 17 facilitates printing of the resistor film 13 or the like since the surface to be provided with the resistor film 13 is substantially flattened. However, if such an advantage is not desired, separate insulation layers may be provided on the respective terminal electrodes so that the body of the capacitor element is exposed between the insulation layers to be directly in contact with a part of the resistor film.

Although the resistor film 13 is smaller in width than the insulation layer 17 not to extend beyond respective side edges of the insulation layer 17 as obvious from FIG. 2, the resistor film may extend beyond the side edges of the insulation film in regions not being in contact with the terminal electrodes 15 and 16.

The insulation layer 17 is formed to cover the entire width of the body 14 of the capacitor element 12 as shown in FIG. 2. Thus, even if the resistor film 13 is trimmed by laser, the body 14 of the capacitor element 12 can be reliably prevented by the insulation layer 17 from inattentive direct exposure to the laser. However, this is not a mandatory requirement as a matter of course, but the insulation layer 17 may be smaller in width than the body 14.

Although the capacitor element 12 comprises a laminated ceramic capacitor chip in the aforementioned RC composite component, the invention is not restricted to the laminated capacitor. Further, although the body 14 of the capacitor element 12 is made of ceramics in case of a ceramic capacitor, the same may be made of other material.

Further, the composite component to which the present invention is applied is not restricted to the RC composite component, but may be composed of a resistor element and an inductance element, for example. The point is that the present invention is applicable to any composite component so far as the same comprises at least first and second functional elements and the first functional element is formed by a resistor film.

Although the present invention has been described and illustrated in detail with respect to embodiments thereof, it is clearly understood that the same is by way of illustration and example only and is not to be taken by way of limitation, the spirit and scope of the present invention being limited only by the terms of the appended claims.

What is claimed is:

1. A chip-type electronic composite component comprising:
   a first functional element comprising a resistor element formed by a resistor film;
   a second chip-shaped functional element having a chip-shaped body with a pair of opposite end portions, and first and second terminal electrodes respectively provided on surfaces of both end portions of said body; and electric insulation layer means for partially covering said first and second terminal electrodes, as well as to at least patially cover said surface of said body across respective boundary lines between said first and second terminal electrodes and surface parts of said body uncovered by said first and second terminal electrodes, said resistor film being formed to electrically connect said first and second terminal electrodes across respective boundary lines between said insulation layer means and said first and second terminal electrodes while partially covering said first and second terminal electrodes uncovered by said insulation layer means.

2. An electronic composite component in accordance with claim 1, wherein said boundary lines between said insulation layer means and said first and second terminal electrodes extend linearly.

3. An electronic composite component in accordance with claim 1, wherein said insulation layer means comprises an insulation layer which is formed to continuously extend with prescribed width between positions for partially covering said first and second terminal electrodes respectively.

4. An electronic composite component in accordance with claim 3, wherein said resistor film is formed to extend within a range of said prescribed width of said insulation layer.

5. An electronic composite component in accordance with claim 3, wherein said prescribed width conforms with the width of said surface of said body formed with said insulation layer.

6. An electronic composite component in accordance with claim 4, wherein said prescribed width conforms with the width of said surface of said body formed with said insulation layer.

7. An electonic composite component in accordance with claim 1, wherein said second functional element comprises a capacitor chip element.

8. An electronic composite component in accordance with claim 7, wherein said capacitor chip element is a ceramic capacitor element having exposed ceramic material.

9. A chip-type electronic composite component manufactured through the steps of:

preparing a chip-shaped functional element having a chip-shaped body with two opposed end portions, and first and second terminal electrodes formed on surfaces of both end portions of said body respectively;

forming an electric insulation layer to partially cover said first and second terminal electrodes, as well as to at least partially cover the surface of said body across boundary lines between said first and second terminal electrodes and surface parts of said body uncovered by said first and second terminal electrodes, thereby to determine the distance between said uncovered regions of said first and second terminal electrodes; and forming a resistor film to partially cover respective said uncovered regions of said first and second terminal electrodes, as well as to electrically connect said first and second terminal electrodes across respective boundary lines between said insulation layer and said first and second terminal electrodes.

* * * * *